US010620995B2

(12) United States Patent
Jones et al.

(10) Patent No.: US 10,620,995 B2
(45) Date of Patent: *Apr. 14, 2020

(54) DYNAMIC WORKLOAD BUCKET REASSIGNMENT

(71) Applicant: INTERNATIONAL BUSINESS MACHINES CORPORATION, Armonk, NY (US)

(72) Inventors: Nicholas R. Jones, Poughkeepsie, NY (US); Daniel Rosa, Highland, NY (US); Donald W Schmidt, Stone Ridge, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/814,807

(22) Filed: Nov. 16, 2017

(65) Prior Publication Data

US 2019/0065245 A1 Feb. 28, 2019

Related U.S. Application Data

(63) Continuation of application No. 15/690,334, filed on Aug. 30, 2017.

(51) Int. Cl.
*G06F 9/46* (2006.01)
*G06F 9/48* (2006.01)
*G06F 9/50* (2006.01)

(52) U.S. Cl.
CPC .............. *G06F 9/4881* (2013.01); *G06F 9/50* (2013.01); *G06F 9/505* (2013.01)

(58) Field of Classification Search
CPC ........... G06F 9/4881; G06F 9/50; G06F 9/505
See application file for complete search history.

(56) References Cited

U.S. PATENT DOCUMENTS

| 7,139,772 | B2 | 11/2006 | Bamford et al. |
| 8,620,851 | B2 | 12/2013 | Brown et al. |
| 2014/0180461 | A1 | 6/2014 | Heck et al. |
| 2018/0143852 | A1* | 5/2018 | Ballantyne ............ G06F 9/5027 |
| 2018/0210756 | A1* | 7/2018 | Ranganathan ........ G06F 9/4881 |

OTHER PUBLICATIONS

List of IBM Patents or Patent Applications Treated as Related; (Appendix P), Filed Nov. 16, 2017); 2 pages.
Nicholas R. Jones et al., "Dynamic Workload Bucket Reassignment", U.S. Appl. No. 15/690,334, filed Aug. 30, 2017.

* cited by examiner

*Primary Examiner* — Bing Zhao
(74) *Attorney, Agent, or Firm* — Cantor Colburn LLP; William Kinnaman

(57) ABSTRACT

A computer-implemented method for dynamic workload bucket reassignment in a system processor includes grouping a plurality of like workloads together via a common workload attribute. The processor calculates an aggregate use of a resource across all of the workloads, and creates a finite number of buckets. The processor then assigns a target resource use for each of the finite number of buckets, and assigns workloads with a same workload attribute value to a bucket of the finite number of buckets. The workload attribute values are distributed across a plurality of the finite number of buckets such that each bucket has a unique nonintersecting range and an aggregate workload resource use in each bucket near a bucket target resource use.

10 Claims, 2 Drawing Sheets

DYNAMIC WORKLOAD BUCKET REASSIGNMENT

DOMESTIC PRIORITY

This application is a continuation of and claims priority from U.S. patent application Ser. No. 15/690,334, filed on Aug. 30, 2017, entitled "DYNAMIC WORKLOAD BUCKET REASSIGNMENT," the content of which are incorporated herein by reference in its entirety

BACKGROUND

The present invention relates to workload classification in operating systems, and more specifically, dynamic workload reassignment.

Operating systems (e.g. z/OS) provide controls to share finite hardware resources amongst client services. A workload consists of 1 or more jobs performing computing for similar client services. When multiple workloads are executing in parallel on the same operating system, a component such as WorkLoad Manager (WLM) on z/OS provides controls to define attributes for each workload such as an importance level (e.g. 1-5 indicating most important to least important) and a goal (e.g. response time). At regular intervals (e.g. every 10 s), WLM may change the scheduler priority attribute of each workload (and all jobs associated with the workload) so most important workloads achieve their goals. Work represents the aggregate computing performed across all workloads.

For images serving multiple (double digits) workloads, transient performance problem diagnosis has required identifying problematic workload(s), defining root cause, and recommending corrective action. A performance analyst uses visual analytics to graphically visualize activity (e.g. CPU execution time, CPU efficiency, CPU delay, serialization contention, etc.) against time for all work to define normal and anomalous activity. Detailed visual analytics against each workload can be overwhelming and requires significant processing resources.

SUMMARY

Embodiments of the present invention are directed to a method for dynamic workload bucket reassignment in a system processor. Via the processor, the method includes grouping a plurality of like workloads together via a common workload attribute. The processor calculates an aggregate use of a resource across all of the workloads, and creates a finite number of buckets. The processor then assigns a target resource use for each of the finite number of buckets, and assigns workloads with a same workload attribute value to a bucket of the finite number of buckets. The processor then distributes the workload attribute values across a plurality of the finite number of buckets such that each bucket has a unique nonintersecting range and an aggregate workload resource use in each bucket near a bucket target resource use.

Embodiments of the present invention further include a system and computer program product each configured to perform the method described above.

DETAILED DESCRIPTION

Figure 1:
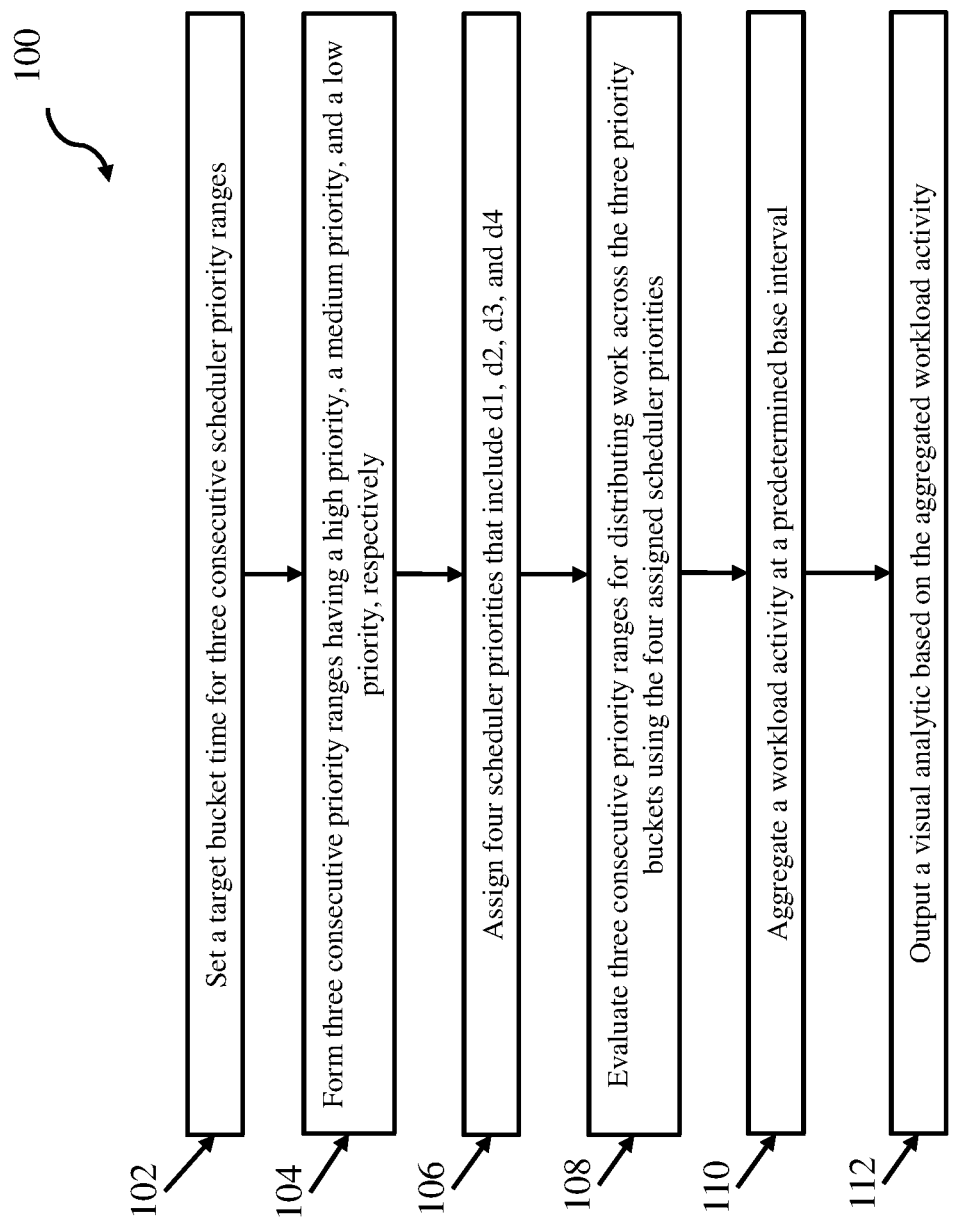
FIG. 1 depicts a method for dynamic workload bucket reassignment according to one embodiment.

Grouping workloads into a small number of buckets enables performance analysts to eliminate workload groups with normal activity and highlight workload groups with anomalous activity. To aid performance analysts, some operating systems functions like z/OS High-Frequency Throughput Statistics (HFTS) have introduced a high frequency (e.g. 5 seconds) data collection process. A data collection engine summarizes workload activity by grouping workloads according to a workload attribute (e.g. scheduler priority) into a finite number (single-digits to teens) of buckets. A grouping engine assigns each bucket a unique range of workload attribute values (e.g. a consecutive scheduler priority range) such that work resource use (e.g. CPU time) is well distributed across all buckets and each workload belongs to exactly one bucket (based on its scheduler priority). HFTS records aggregate activity of workloads in the bucket and summarizes workload activity and identity of the most significant workload. If the bucket priority ranges were recalculated every HFTS interval (e.g., 5 seconds), the workloads would be well distributed but that would make identifying normal and anomalous behavior impossible due to the lack of consistent base metrics to compare against. If the bucket priority ranges were not recalculated frequently enough, the work will not be well distributed thereby limiting the effectiveness of the analysis.

Both the distribution of work and consistency over time of workloads assigned to buckets can play a critical role in the resulting value of performing visual analytics to diagnose which workload(s) are contributing to a transient performance problem. A performance analyst needs workload buckets to be dynamic enough to distribute the work well across a small number of buckets (single digits to teens) and static enough to identify normal and anomalous activity in a bucket across multiple intervals. On the HFTS priority bucket interval (which may be, for example, 1 minute) at the top of the interval (e.g., 0 second mark every minute—which is predictable), a grouping engine reassigns the consecutive scheduler priority ranges for each bucket to best distribute CPU resource use (CPU time) of the work across the buckets. On the HFTS base interval (which may be measured in seconds (e.g. 5 seconds)), each workload's activity over the interval is aggregated into the appropriate bucket according to its scheduler priority, and the most significant workload's activity and identity are set for each bucket. With these design principles, the workloads are redistributed over the buckets on long bucket intervals (e.g., 1 minute) and the workloads stay in the same bucket across multiple HFTS base intervals (e.g. 5 seconds). This enables visual analytics to differentiate between normal and anomalous activity in each bucket over multiple HFTS base intervals to identify the bucket(s) exhibiting anomalous activity. Mapping the buckets with anomalous activity to significant workload identities is critical to enabling performance analysts to derive actionable insights from the data.

FIG. 1 depicts a method for dynamic workload management according to one embodiment. According to one embodiment using three buckets, as represented in block 102, a processor sets a target bucket resource use for CPU time. Accordingly, on a priority bucket interval (e.g. 1 minute) at the top of interval (e.g., 0 second mark every minute), a processor running a scheduling engine (e.g., processor 201 running scheduling engine 214 (FIG. 2))

calculates 3 consecutive scheduler priority ranges that best distributes the work by workload and by resource use (CPU time) across 3 priority buckets (high, medium, and low).

As shown in block 104, in this embodiment the scheduling engine 214 sets the target bucket CPU Time to ⅓ of aggregate CPU time across all scheduler priorities, but variations in CPU time consumed at each scheduler priority typically prevent equal CPU time in each bucket.

In this embodiment, the scheduling engine needs 4 scheduler priorities from highest to lowest (d1, d2, d3, d4) to form 3 consecutive scheduler priority ranges ([d1,d2], [d2−1,d3+1], [d3,d4], representing the high, medium, and low priority buckets). Accordingly, at block 106, the scheduling engine 214 forms the three consecutive priority ranges of differing priorities. In some aspects, d1 always represents the maximum scheduler priority and d4 always represents the lowest scheduler priority. The scheduling engine determines candidates for d2 and d3 as follows:

First, for Candidate 1: The scheduling engine calculates candidate 1 d2 (c1d2) and candidate 1 d3 (c1d3) as follows:

The processor sets c1d2 to the highest c1d2 priority such that [d1,c1d2] CPU time that is greater than or equal to the target bucket CPU Time.

Then, the scheduling engine sets c1d3 to the lowest c1d3 priority such that [c1d3,d4] CPU time is greater than or equal to target bucket CPU Time.

Next, for calculating Candidate 2, the scheduling engine uses candidate 1 d2 (c1d2) and candidate 1 d3 (c1d3) as a starting point and then moves the first low priority into the medium priority bucket. The scheduling engine moves the first low priority as follows:

As a first step, the scheduling engine sets c2d2 to be equal to c1d2, and sets c2d3 to be equal to c1d3+1.

Then to calculate Candidate 3, the scheduling engine uses candidate 1 d2 (c1d2) and candidate 1 d3 (c1d3) as a starting point, then moves the last high priority into the medium priority bucket. The scheduling engine does this by setting c3d2 to be equal to c1d2−1, and setting c3 d3 to be equal to c1d3.

To calculate Candidate 4, the scheduling engine uses candidate 1 d2 (c1d2) and candidate 1 d3 (c1d3) as a starting point, moves the last high priority into the medium priority bucket, and moves the first low priority into the medium priority bucket. This is done by setting c4d2 to be equal to c1d2−1, and setting c4d3 to be equal to c1d3+1.

In this embodiment, with the candidates set, as represented by block 108, the scheduling engine 214 then evaluates the three consecutive priority ranges for distributing work across the three priority buckets. Accordingly, the scheduling engine 214 scores each candidate by summing the absolute value (denoted by |xxx| below) of the difference between each respective priority bucket's CPU time and target bucket CPU Time. For example, the scheduling engine sets Candidate 1 Score to:

|([d1,c1d2] CPU Time)−target bucket CPU Time|+|([c1d2−1,c1d3+1] CPU Time)−target bucket CPU Time|+|([c1d3,d4] CPU Time)−target bucket CPU Time|.

Similarly, the processor sets Candidate 2 Score to:

|([d1,c2d2] CPU Time)−target bucket CPU Time|+|([c2d2−1,c2d3+1] CPU Time)−target bucket CPU Time|+|([c2d3,d4] CPU Time)−target bucket CPU Time|.

Then Candidate 3 Score is set to:

|([d1,c3d2] CPU Time)−target bucket CPU Time|+|([c3d2−1,c3d3+1] CPU Time)−target bucket CPU Time|+|([c3d3,d4] CPU Time)−target bucket CPU Time|.

Candidate 4 Score is set to:

|([d1,c4d2] CPU Time)−target bucket CPU Time|+|([c4d2−1,c4d3+1] CPU Time)−target bucket CPU Time|+|([c4d3,d4] CPU Time)−target bucket CPU Time|

The scheduling engine then finds the candidate lowest score and sets d2 and d3. In some aspects, if there is a tie for the lowest score, the scheduling engine will chose the lowest number candidate.

At block 110, according to one embodiment, the scheduling engine 214 aggregates each workload's activity at every base interval (e.g. an interval of 5 seconds) into the appropriate priority bucket according to its scheduler priority and sets the workload activity and identity of the most significant workload.

As shown in block 112, the system may output bucket data for performing visual analytics using bucket statistics from base intervals (e.g. 5 seconds) that belong to the same bucket interval (e.g. 60 seconds) to identify normal and anomalous activity, quickly eliminate buckets (and their contained workloads) with no anomalous activity, and highlight buckets with anomalous activity. In some aspects, performance analysts can dig deeper into anomalous buckets beginning with the most significant jobs for each base interval (e.g. 5 seconds). For example, the processor may output visual analytics to an operatively connected output device.

According to embodiments of the present invention, a performance analyst can much more quickly identify which workload(s) are contributing to a transient performance problem.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Figure 2:
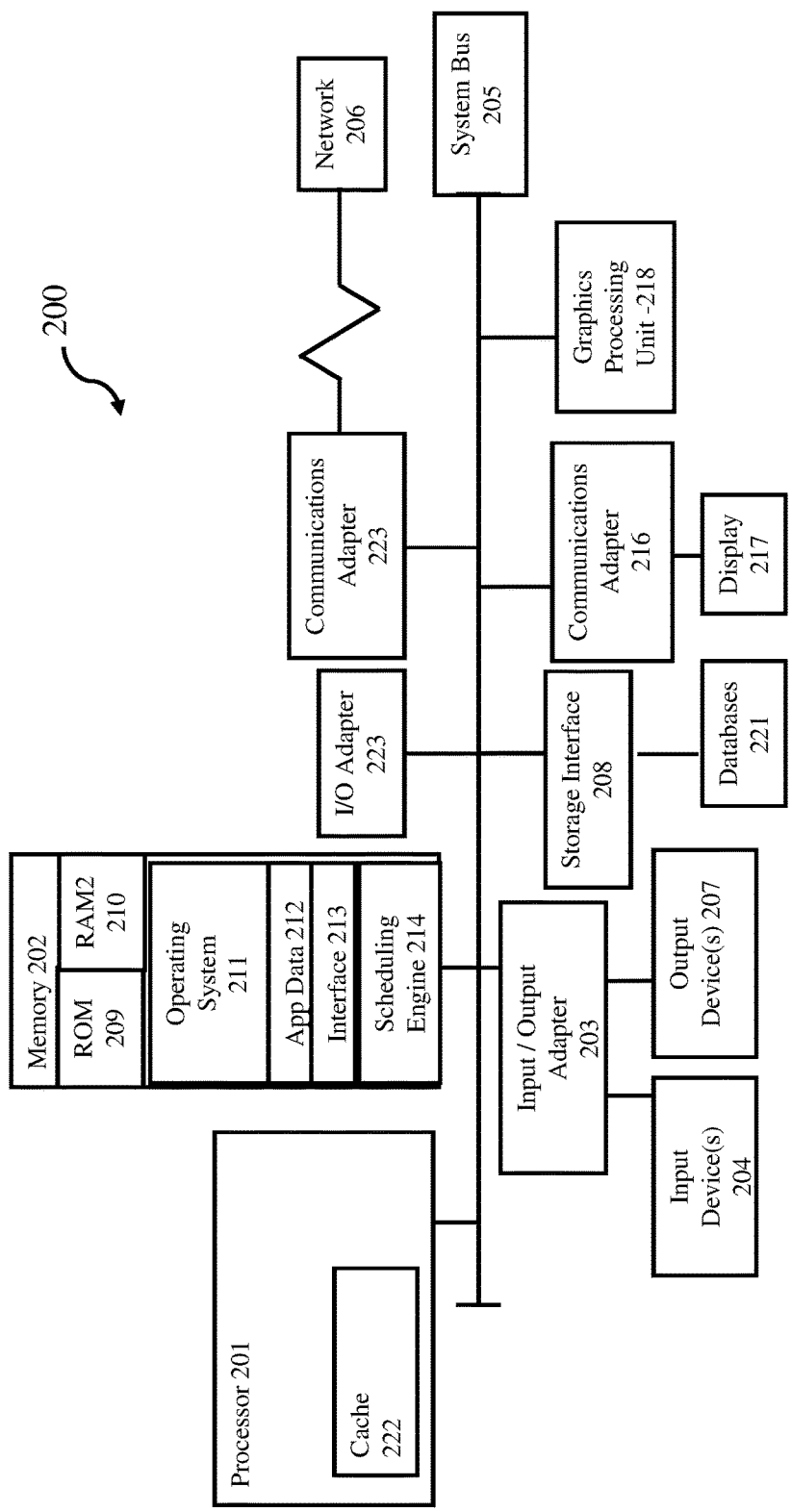
FIG. 2 depicts a computer system for performing the method of FIG. 1.

FIG. 2 illustrates a block diagram of an exemplary computing environment and computer system 200 for use in practicing the embodiments described herein. The environment and system described herein can be implemented in hardware, software (e.g., firmware), or a combination thereof. In an exemplary embodiment, a hardware implementation can include a microprocessor of a special or general-purpose digital computer, such as a personal computer, workstation, minicomputer, or mainframe computer. Computer 200, therefore, can embody a general-purpose computer. In another exemplary embodiment, the implementation can be part of a mobile device, such as, for example, a mobile phone, a personal data assistant (PDA), a tablet computer, etc.

As shown in FIG. 2, the computer 200 includes processor 201. Computer 200 also includes memory 202 communicatively coupled to processor 201, and one or more input/output adapters 203 that can be communicatively coupled via system bus 205. Memory 202 can be communicatively coupled to one or more internal or external memory devices via a storage interface 208. Communications adapter 216 can communicatively connect computer 200 to one or more networks 206. The system bus 205 can communicatively connect one or more user interfaces via input/output (I/O) adapter 203. I/O adapter 203 can connect a plurality of input devices 204 to computer 200. Input devices can include, for example, a keyboard, a mouse, a microphone, a sensor, etc. The system bus 205 can also communicatively connect one or more output devices 207 via I/O adapter 203. Output device 207 can include, for example, a display, a speaker, a touchscreen, etc.

Processor 201 is a hardware device for executing program instructions (aka software), stored in a computer-readable memory (e.g., memory 202). Processor 201 can be any custom made or commercially available processor, a central processing unit (CPU), a plurality of CPUs, for example, CPU 201a-201c, an auxiliary processor among several other processors associated with the computer 200, a semiconductor based microprocessor (in the form of a microchip or chip set), or generally any device for executing instructions. Processor 201 can include a cache memory 222, which can include, but is not limited to, an instruction cache to speed up executable instruction fetch, a data cache to speed up data fetch and store, and a translation lookaside buffer (TLB) used to speed up virtual-to-physical address translation for both executable instructions and data. Cache memory 222 can be organized as a hierarchy of more cache levels (L1, L2, etc.).

Processor 201 can be disposed in communication with one or more memory devices (e.g., RAM 209, ROM 210, one or more external databases 221, etc.) via a storage interface 208. Storage interface 208 can also connect to one or more memory devices including, without limitation, one or more databases 221, and/or one or more other memory drives (not shown) including, for example, a removable disc drive, etc., employing connection protocols such as serial advanced technology attachment (SATA), integrated drive electronics (IDE), IEEE-1394, universal serial bus (USB), fiber channel, small computer systems interface (SCSI), etc. The memory drives can be, for example, a drum, a magnetic disc drive, a magneto-optical drive, an optical drive, a redundant array of independent discs (RAID), a solid-state memory device, a solid-state drive, etc. Variations of memory devices can be used for implementing, for example, list all databases from other figures.

Memory 202 can include random access memory (RAM) 209 and read only memory (ROM) 210. RAM 209 can be any one or combination of volatile memory elements (e.g., DRAM, SRAM, SDRAM, etc.). ROM 210 can include any one or more nonvolatile memory elements (e.g., erasable programmable read only memory (EPROM), flash memory, electronically erasable programmable read only memory (EEPROM), programmable read only memory (PROM), tape, compact disc read only memory (CD-ROM), disk, cartridge, cassette or the like, etc.). Moreover, memory 202 can incorporate electronic, magnetic, optical, and/or other types of non-transitory computer-readable storage media. Memory 202 can also be a distributed architecture, where various components are situated remote from one another, but can be accessed by processor 201.

The instructions in memory 202 can include one or more separate programs, each of which can include an ordered listing of computer-executable instructions for implementing logical functions. In the example of FIG. 2, the instructions in memory 202 can include an operating system 211. Operating system 211 can control the execution of other computer programs and provides scheduling, input-output control, file and data management, memory management, and communication control and related services.

The program instructions stored in memory 202 can further include application data 212, and for a user interface 213.

I/O adapter 203 can be, for example but not limited to, one or more buses or other wired or wireless connections. I/O adapter 203 can have additional elements (which are omitted for simplicity) such as controllers, microprocessors, buffers (caches), drivers, repeaters, and receivers, which can work in concert to enable communications. Further, I/O adapter 203 can facilitate address, control, and/or data connections to enable appropriate communications among the aforementioned components.

I/O adapter 203 can further include a display adapter coupled to one or more displays. I/O adapter 203 can be configured to operatively connect one or more input/output (I/O) devices 207 to computer 200. For example, I/O 203 can connect a keyboard and mouse, a touchscreen, a speaker, a haptic output device, or other output device. Output devices 207 can include but are not limited to a printer, a scanner, and/or the like. Other output devices can also be included, although not shown. Finally, the I/O devices connectable to I/O adapter 203 can further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like.

According to some embodiments, computer 200 can include a mobile communications adapter 223. Mobile communications adapter 223 can include GPS, cellular, mobile, and/or other communications protocols for wireless communication.

In some embodiments, computer 200 can further include communications adapter 216 for coupling to a network 206.

Network 206 can be an IP-based network for communication between computer 200 and any external device. Network 206 transmits and receives data between computer 200 and devices and/or systems external to computer 200. In an exemplary embodiment, network 206 can be a managed IP network administered by a service provider. Network 206 can be a network internal to an aircraft, such as, for example, an avionics network, etc. Network 206 can be implemented in a wireless fashion, e.g., using wireless protocols and technologies, such as WiFi, WiMax, etc. Network 206 can also be a wired network, e.g., an Ethernet network, an ARINC 429 network, a controller area network (CAN), etc., having any wired connectivity including, e.g., an RS232 connection, R5422 connection, etc. Network 206 can also be a packet-switched network such as a local area network, wide area network, metropolitan area network, Internet network, or other similar type of network environment. The network 206 can be a fixed wireless network, a wireless local area network (LAN), a wireless wide area network (WAN) a personal area network (PAN), a virtual private network (VPN), intranet or other suitable network system.

Network 206 can operatively connect computer 200 to one or more devices including device 217, device 218, and device 220. Network 206 can also connect computer 200 to one or more servers such as, for example, server 219.

If computer 200 is a PC, workstation, laptop, tablet computer and/or the like, the instructions in the memory 202 can further include a basic input output system (BIOS) (omitted for simplicity). The BIOS is a set of routines that initialize and test hardware at startup, start operating system 211, and support the transfer of data among the operatively connected hardware devices. The BIOS is typically stored in ROM 210 so that the BIOS can be executed when computer 200 is activated. When computer 200 is in operation, processor 201 can be configured to execute instructions stored within the memory 202, to communicate data to and from the memory 202, and to generally control operations of the computer 200 pursuant to the instructions.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for dynamic workload bucketizing for analytics comprising:
   grouping, via a processor, a plurality of like workloads together via a common workload attribute;
   calculating, via the processor, an aggregate use of a resource across all of the workloads;
   creating, via the processor, a finite number of buckets;
   assigning, via the processor, a target resource use for each of the finite number of buckets;
   assigning, via the processor, workloads with a same workload attribute value to a bucket of the finite number of buckets;
   distributing, via the processor, the workload attribute values across a plurality of the finite number of buckets such that each bucket has a unique nonintersecting range and an aggregate workload resource use in each bucket near a bucket target resource use;
   aggregating, via the processor, bucket workload activity across all workloads for each bucket of the finite number of buckets;
   aggregating via the processor, workload activity in each bucket of the finite number of buckets;
   summarizing, via the processor, an identification of a most significant workload or job in each bucket of the finite number of buckets;
   collecting, via the processor, a plurality of bucket statistics at a high frequency base interval;
   reassigning, via the processor, target bucket resource use and redistributing the workload attribute values across the finite number of buckets at a low frequency bucket interval time; and
   performing, via the processor, analytics using the plurality of bucket statistics from base intervals belonging to a same bucket interval.

2. The method of claim 1, wherein the low frequency bucket interval is a multiple of the high frequency base interval time.

3. The method of claim 1, wherein the high frequency base interval and low frequency bucket interval both occur at one or more second offsets every minute.

4. The method of claim 1, wherein the processor adjusts the low frequency bucket interval to a higher or lower multiple of the high frequency base interval time.

5. The method of claim 1, wherein the high frequency base interval is a five second interval.

6. The method of claim 1, wherein the low frequency bucket interval time is a sixty second interval.

7. The method of claim 1, wherein the finite number of buckets comprises three buckets.

8. The method of claim 7, wherein the finite number of buckets comprise a high priority bucket, a medium priority bucket, and a low priority bucket.

9. The method of claim 1, wherein the target resource comprises a target central processing unit (CPU) time for each bucket.

10. The method of claim 1, wherein assigning workloads with the same workload attribute value comprises assigning all workloads with a same priority to a common bucket.

* * * * *